United States Patent
Ueda

(10) Patent No.: US 7,603,994 B2
(45) Date of Patent: Oct. 20, 2009

(54) ABNORMALITY DIAGNOSIS DEVICE AND CONTROL SYSTEM FOR INTERNAL COMBUSTION ENGINE

(75) Inventor: Kuniaki Ueda, Toyota (JP)

(73) Assignee: Denso Corporation, Kariya (JP)

( * ) Notice: Subject to any disclaimer, the term of this patent is extended or adjusted under 35 U.S.C. 154(b) by 9 days.

(21) Appl. No.: 12/132,269

(22) Filed: Jun. 3, 2008

(65) Prior Publication Data

US 2008/0312806 A1  Dec. 18, 2008

(30) Foreign Application Priority Data

Jun. 14, 2007  (JP) .............................. 2007-157568

(51) Int. Cl.
F02D 41/22 (2006.01)
(52) U.S. Cl. .................. 123/673; 123/690; 701/107
(58) Field of Classification Search .................. 123/672, 123/673, 688, 690; 701/109; 73/114.72, 73/114.73
See application file for complete search history.

(56) References Cited

U.S. PATENT DOCUMENTS

| | | | |
|---|---|---|---|
| 6,772,585 B2 * | 8/2004 | Iihoshi et al. .................. 60/277 |
| 7,243,644 B2 | 7/2007 | Okamoto et al. | |
| 7,409,284 B2 * | 8/2008 | Okamoto et al. ............ 701/109 |
| 2007/0175462 A1 | 8/2007 | Okamoto et al. | |

FOREIGN PATENT DOCUMENTS

JP  2006-138280  6/2006

* cited by examiner

*Primary Examiner*—Hai H Huynh
(74) *Attorney, Agent, or Firm*—Nixon & Vanderhye P.C.

(57) ABSTRACT

An exhaust gas discharged from a combustion chamber of each cylinder flows near an air-fuel ratio sensor via a junction. An ECU estimates an air-fuel ratio of each cylinder based upon a sensing value of an air-fuel ratio sensor. When a variation in the air-fuel ratio among the cylinders is equal to or greater than a predetermined value, the ECU determines that an abnormality exists in the air-fuel ratio. When a quantity of the exhaust gas discharged from each cylinder is less than another predetermined value, an intake air quantity is increased and ignition timing is delayed before the determination of presence or absence of the abnormality.

12 Claims, 4 Drawing Sheets

ABNORMALITY DIAGNOSIS DEVICE AND CONTROL SYSTEM FOR INTERNAL COMBUSTION ENGINE

CROSS REFERENCE TO RELATED APPLICATION

This application is based on and incorporates herein by reference Japanese Patent Application No. 2007-157568 filed on Jun. 14, 2007.

BACKGROUND OF THE INVENTION

1. Field of the Invention

The present invention relates to an abnormality diagnosis device and a control system of a multi-cylinder internal combustion engine having a diagnosing device for diagnosing presence or absence of an abnormality in an individual air-fuel ratio of each of multiple cylinders based upon a sensing value of an air-fuel ratio sensing device arranged downstream of a junction of the engine where exhaust gases discharged respectively from the multiple cylinders converge.

2. Description of Related Art

As an abnormality diagnosis device of this type, there is a proposed abnormality diagnosis device that diagnoses presence or absence of an abnormality in an air-fuel ratio of an arbitrary cylinder by comparing the air-fuel ratio of the arbitrary cylinder with an average value of air-fuel ratios of the other cylinders except for the minimum value and the maximum value of the air-fuel ratio (for example, as described in JP-A-2006-138280). With this abnormality diagnosis device, even when an abnormality arises in the air-fuel ratio of the cylinder other than the arbitrary cylinder, the air-fuel ratio of the abnormal cylinder can be excluded from the comparison object to be compared with the air-fuel ratio of the arbitrary cylinder. As a result, the presence or absence of the abnormality in the air-fuel ratio of the arbitrary cylinder can be diagnosed with high accuracy.

The inventor found that in the case of estimating the air-fuel ratio of each cylinder based upon the sensing value of the air-fuel ratio sensor arranged downstream of the junction, estimation accuracy of the air-fuel ratio deteriorates when an exhaust quantity discharged from each cylinder per exhaust stroke is small. Therefore, the abnormality diagnosis device described above cannot appropriately detect an abnormality even if the abnormality arises in an air-fuel ratio of a certain cylinder when the exhaust quantity from each cylinder is small.

SUMMARY OF THE INVENTION

It is an object of the present invention to provide an abnormality diagnosis device and a control system of a multi-cylinder internal combustion engine capable of appropriately diagnosing presence or absence of an abnormality in an individual air-fuel ratio of each of multiple cylinders based upon a sensing value of an air-fuel ratio sensing device arranged downstream of a junction where exhaust gases discharged respectively from the multiple cylinders converge.

According to a first aspect of the present invention, an abnormality diagnosis device of a multi-cylinder internal combustion engine having a junction where exhaust gases discharged respectively from multiple cylinders converge includes an air-fuel ratio sensing device disposed downstream of the junction for sensing an air-fuel ratio of the exhaust gas, a diagnosing device for diagnosing presence or absence of an abnormality in an individual air-fuel ratio corresponding to each cylinder based upon a sensing value of the air-fuel sensing device, a determining device for determining whether a quantity of the exhaust gas discharged from each cylinder per exhaust stroke is equal to or greater than a first predetermined value, and a prohibiting device for prohibiting the diagnosis when the determining device determines that the quantity of the exhaust gas is less than the first predetermined value.

When the quantity of the exhaust gas discharged from each cylinder per exhaust stroke is small, the abnormality diagnosis cannot be performed appropriately. The first aspect of the present invention pays attention to this point and prohibits the abnormality diagnosis when the exhaust gas quantity is less than the first predetermined value. Thus, the first aspect of the present invention can avert deterioration of diagnosis accuracy, which can be caused if the abnormality diagnosis is executed under a situation where the abnormality diagnosis cannot be performed appropriately.

It should be preferably determined whether the exhaust gas quantity is equal to or greater than the first predetermined value based upon a sensing value of an intake air quantity sensing device that senses an intake air quantity of the multi-cylinder internal combustion engine.

According to a second aspect of the present invention, the abnormality diagnosis device further includes an increasing device for increasing the intake air quantity to remove the prohibition by the prohibiting device when the quantity of the exhaust gas discharged from each cylinder per exhaust stroke is less than the first predetermined value and a restricting device for restricting an increase in torque due to an increase in the intake air quantity by the increasing device.

The second aspect of the present invention increases the intake air quantity under the situation where the individual air-fuel ratio of each cylinder cannot be estimated appropriately, i.e., under the condition where the quantity of the exhaust gas discharged from each cylinder is small. Therefore, execution frequency of the diagnosis can be increased as compared to the case of executing the diagnosis after waiting until the exhaust gas quantity increases. Further, since the restricting device is provided, the increase in the torque of the internal combustion engine due to the execution of the abnormality diagnosis can be restricted.

According to a third aspect of the present invention, the multi-cylinder internal combustion engine is a spark ignition type internal combustion engine and the restricting device has a device for performing delay control of ignition timing.

If the ignition timing is delayed, the torque produced in the internal combustion engine reduces. Further, a response delay of the delay control of the ignition timing is so small as to be negligible as compared to a response delay from an operation of an actuator for increasing the intake air quantity to actual increase in the intake air quantity. Therefore, the control for restricting the increase in the torque at the timing when the intake air quantity actually increases can be performed with a relatively simple setting.

According to a fourth aspect of the present invention, the diagnosing device determines that the air-fuel ratio is abnormal when a variation in the air-fuel ratio among the cylinders is equal to or greater than a second predetermined value.

In the case where the air-fuel ratio sensing device is arranged downstream of the junction where the exhaust gases discharged respectively from the multiple cylinders converge, an average air-fuel ratio of the multiple cylinders as a sensing value of the air-fuel ratio sensing device can be controlled as desired. Therefore, if the variation in the air-fuel ratio among the cylinders is small, the individual air-fuel ratio of each cylinder can be also controlled as desired even without estimating the individual air-fuel ratio. However, when the variation in the air-fuel ratio among the cylinders is large, the individual air-fuel ratio of each cylinder cannot be controlled with high accuracy Therefore, it is desired to diagnose the presence or absence of the abnormality that the variation in the air-fuel ratio among the cylinders is equal to or greater than the predetermined value, The fourth aspect of the present invention can suitably meet the desire.

According to a fifth aspect of the present invention, the diagnosing device performs the diagnosis in a steady state where a fluctuation amount of a filling quantity of an air into each cylinder of the multi-cylinder internal combustion engine is equal to or less than a third predetermined value.

The estimation of the individual air-fuel ratio of each cylinder based upon the sensing value of the air-fuel ratio sensing device is difficult when the fluctuation amount of the filling quantity of the air into each cylinder is large. That is, when a model used in the estimation is simplified as much as possible to simplify the estimation processing, it is desired to suppose the steady state where the filling quantity does not fluctuate. In the case of building a model for estimating the individual air-fuel ratio of each cylinder even when the fluctuation amount of the filling quantity is large, the model will become complicated or highly accurate estimation will become difficult even if the complicated model is used. In this respect, the fifth aspect of the present invention performs the abnormality diagnosis when the fluctuation amount of the filling quantity is equal to or less than the predetermined value. As a result, the abnormality diagnosis can be performed easily and highly accurately.

According to a sixth aspect of the present invention, the diagnosing device performs the diagnosis when rotation speed of the multi-cylinder internal combustion engine is equal to or less than a fourth predetermined value.

A time interval between the exhaust top dead centers of the cylinders shortens as the rotation speed increases. Further, in this case, a cycle of switching of the cylinder affecting the sensing value of the air-fuel ratio sensing device most remarkably also shortens. In the case where the cycle is excessively short, even if a state quantity of the exhaust gas such as an oxygen concentration of the exhaust gas near the air-fuel ratio sensing device changes with time due to a variation in the air-fuel ratio among the cylinders, there is a possibility that the sensing value of the air-fuel ratio sensing device cannot respond to the change in the state quantity In this respect, the sixth aspect of the present invention performs the diagnosis when the rotation speed is equal to or less than the predetermined value. In consequence, the diagnosis can be performed under the situation where the change in the state quantity of the exhaust gas near the junction due to the influence of the air-fuel ratio of each cylinder is reflected in the sensing value of the air-fuel ratio sensing device.

According to a seventh aspect of the present invention, a control system of the multi-cylinder internal combustion engine has the abnormality diagnosis device according to any one of the above aspects and injectors for supplying fuel to the respective cylinders of the multi-cylinder internal combustion engine.

An abnormality in the injector is one of causes of the abnormality in the air-fuel ratio. In this respect, the control system according to the seventh aspect of the present invention includes the abnormality diagnosis device and can secure the use of the injector in a normal state.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
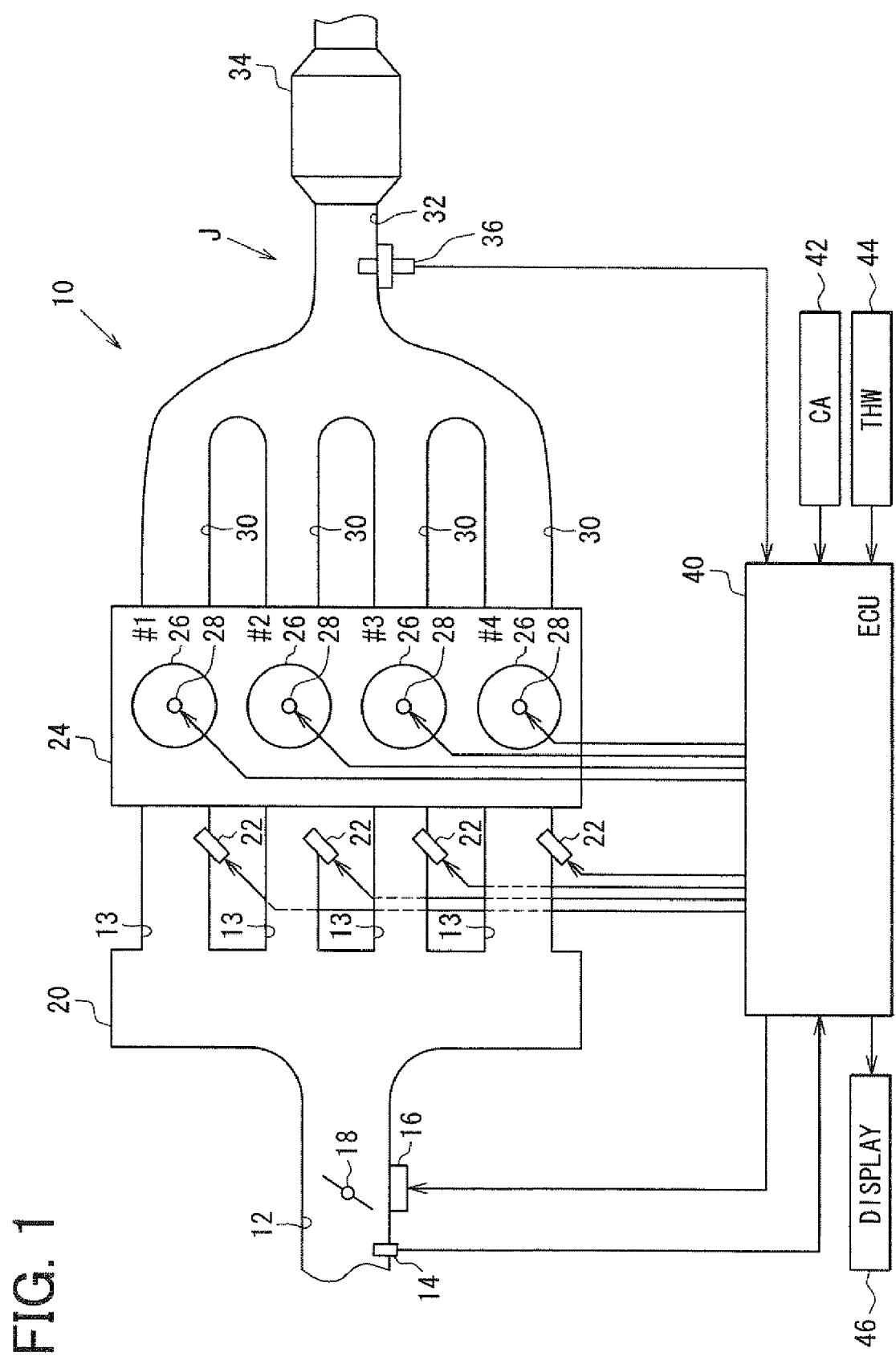
FIG. 1 is a diagram showing a control system of an internal combustion engine according to a first embodiment of the present invention.

Hereinafter, an abnormality diagnosis device and a control system for an internal combustion engine according to a first embodiment of the present invention will be explained with reference to the drawings. FIG. 1 shows an entire construction of a control system according to the present embodiment. An air flow meter 14 for sensing an intake air quantity is provided in an upstream portion of an intake passage 12 of an internal combustion engine 10 as an intake port injection type gasoline engine. An electronically-controlled type intake throttle valve 18 is provided downstream of the air flow meter 14. The intake throttle valve 18 is driven by a motor 16 and adjusts a flow passage area of the intake passage 12. A surge tank 20 is provided by enlarging the flow passage area (or a diameter) of the intake passage 12 downstream of the throttle valve 18 for preventing intake pulsation, intake interference and the like.

A part of the intake passage 12 downstream of the surge tank 20 branches in order to introduce an air into respective cylinders of the internal combustion engine 10. Electronically-controlled injectors 22 are attached to branch passages 13 of the respective cylinders. Each injector 22 injects and supplies fuel near an intake port of each cylinder. In the internal combustion engine 10, each injector 22 provided for each cylinder performs injection supply (i.e., port injection) of the fuel (gasoline). The fuel injected by the injector 22 (to be exact, a mixture gas of the fuel and the intake air) is ignited by an ignition plug 28 in a combustion chamber 26 in each cylinder defined by a cylinder block 24. Thus, the fuel burns through a reaction of the intake air and the fuel. It is assumed that the internal combustion engine 10 according to the present embodiment is a four-cylinder engine and has four cylinders of a first cylinder #1 to a fourth cylinder #4.

The mixture gas used for the combustion in each cylinder is discharged as an exhaust gas into a branch passage 30 of each cylinder in an exhaust passage 32. The branch passages 30 of the respective cylinders converge at a junction J. An exhaust purification device 34 for purifying the exhaust gas is provided downstream of the junction J. A linear air-fuel ratio sensor (an air-fuel ratio sensor 36) is provided downstream of the junction J and upstream of the exhaust purification device 34 for outputting a linear electric signal according to an oxygen concentration in the neighborhood of the air-fuel ratio sensor 36.

An electronic control unit (ECU 40) is a controller, whose control object is the internal combustion engine 10. The ECU 40 operates the throttle valve 18, the injectors 22, the ignition plugs 28 and the like based upon the sensing values of the various sensors such as the air flow meter 14, the air-fuel ratio sensor 36, a crank angle sensor 42 for sensing a rotational angle of a crankshaft of the internal combustion engine 10 (i.e., a crank angle: CA) and a coolant temperature sensor 44 for sensing temperature THW of a coolant of the internal combustion engine 10. Thus, the ECU 40 controls various control quantities of the internal combustion engine 10. The ECU 40 also has a function to output predetermined computation results on a display 46 to notify the results to a user.

Figure 2:
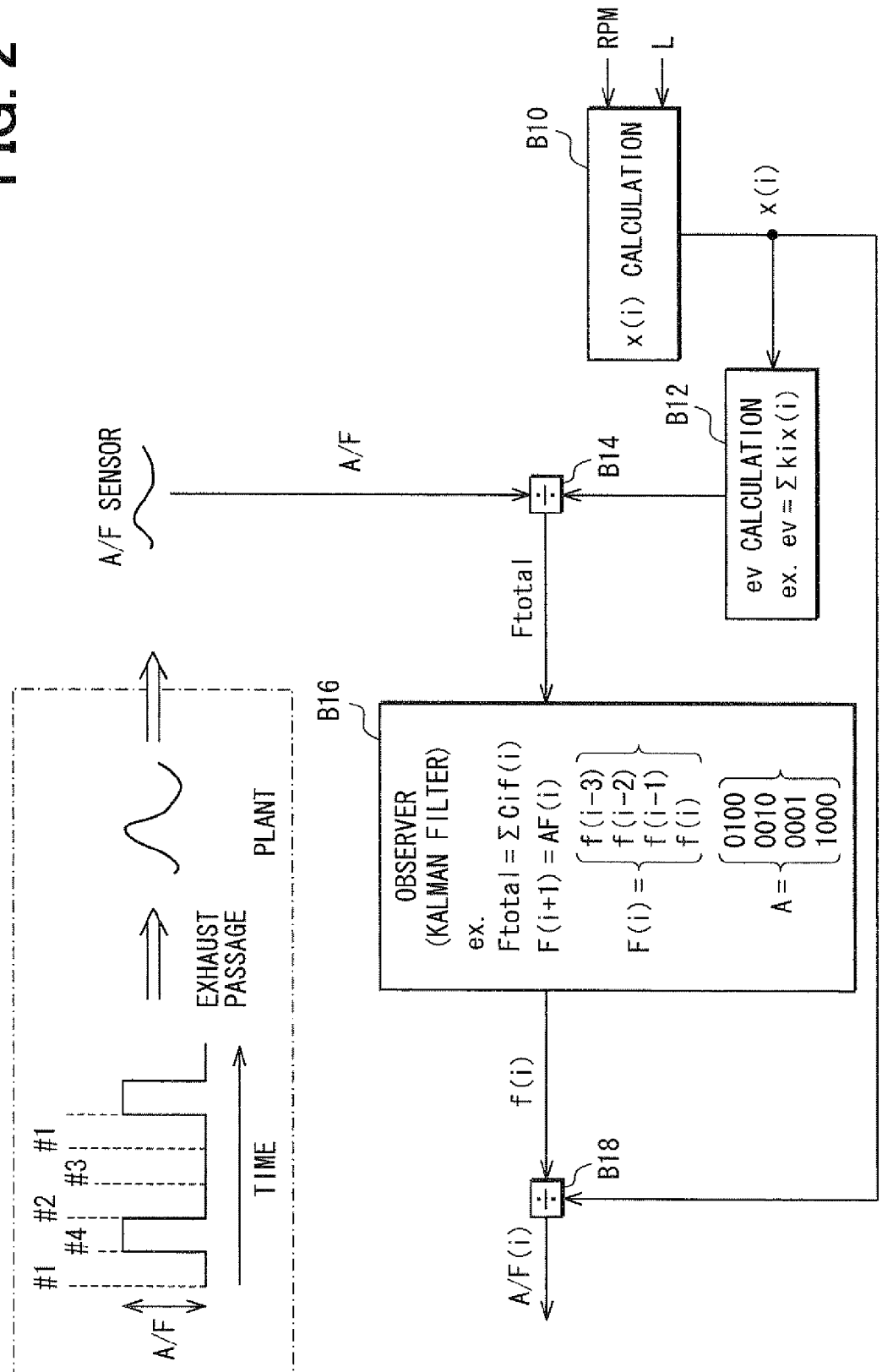
FIG. 2 is a block diagram showing estimation processing of an each cylinder air-fuel ratio according to the first embodiment.

The ECU 40 specifically has a function to estimate an individual air-fuel ratio of each cylinder based upon the sensing value of the air-fuel ratio sensor 36. FIG. 2 particularly shows processing concerning the estimation of the individual air-fuel ratio of each cylinder as part of processing performed by the ECU 40.

An each cylinder exhaust gas quantity calculation section B10 performs map calculation of an exhaust gas quantity x(i) of each cylinder (hereinafter, referred to as an each cylinder exhaust gas quantity x(i)) based upon rotation speed RPM and a load factor L. The load factor L is an intake air quantity per combustion cycle (four strokes) The map for the map calculation is produced through experiments or the like in advance. The integer number i represents a sampling number. The sampling cycle is set at 180° CA as an interval between exhaust top dead centers of the cylinders.

A junction exhaust gas quantity calculation section B12 calculates an exhaust gas quantity "ev" at the junction J based upon the each cylinder exhaust gas quantity x(i). The processing may be performed by modeling the exhaust gas quantity ev at the junction J as a linear function of the each cylinder exhaust gas quantity x(i) and performing weighted average processing of the each cylinder exhaust gas quantities x(i) corresponding to the four cylinders #1-#4.

A junction fuel quantity calculation section B14 divides the junction exhaust gas quantity ev by a sensing value (an air-fuel ratio A/F) of the air-fuel ratio sensor 36 to calculate a fuel quantity at the junction J (hereinafter, referred to as a junction fuel quantity Ftotal).

An observer B16 calculates an estimate of an individual fuel quantity of each cylinder (hereinafter, referred to as an each cylinder fuel quantity f(i)) based upon the junction fuel quantity Ftotal by using a state observation method of modern control. The each cylinder fuel quantity f(i) represents an estimate of the fuel quantity calculated in a present sampling cycle. The sampling cycle is set at 180° CA as the interval between the exhaust top dead centers of the cylinders as in the case of the sampling cycle of the each cylinder exhaust gas quantity x(i). For example, the each cylinder fuel quantity f(i) may be calculated by a calculation method of modeling the junction fuel quantity Ftotal as a linear function of the four each cylinder fuel quantities f(i) of the four cylinders #1-#4. At this point, if a steady state of the air-fuel ratio is supposed and it is assumed that the each cylinder fuel quantity f(i−4) in the previous sampling cycle is equal to the each cylinder fuel quantity f(i) in the present sampling cycle in each cylinder, the each cylinder fuel quantity f(i) can be easily calculated by using the junction fuel quantity Ftotal as an input. Since a noise is mixed into the sensing value of the air-fuel ratio sensor 36, a steady state Kalman filter is used for the estimation in the present embodiment.

An each cylinder air-fuel ratio calculation section B18 estimates (calculates) an air-fuel ratio of each cylinder (hereinafter referred to as an each cylinder air-fuel ratio A/F(i)) by dividing the each cylinder exhaust gas quantity x(i) by the each cylinder fuel quantity f(i).

Through the above processing, the each cylinder air-fuel ratio A/F(i) can be calculated based upon the sensing value of the air-fuel ratio sensor 36. When the each cylinder air-fuel ratio A/F(i) can be calculated, it can be determined whether a variation in the air-fuel ratio among the cylinders is excessively large based upon the calculated each cylinder air-fuel ratio A/F(i). When the variation in the air-fuel ratio among the cylinders is excessively large, there is a concern that characteristics of the exhaust gas discharged downstream of the exhaust purification device 34 deteriorate due to lowering of purification performance of the exhaust purification device 34 or the like even if the sensing value of the air-fuel ratio sensor 36 is controlled to a target value through feedback-control. Therefore, it is important to diagnose presence or absence of an abnormality in the air-fuel ratio causing an excessively large variation in the air-fuel ratio among the cylinders.

It is considered that the causes of the abnormality in the air-fuel ratio among the cylinders include an abnormality in the injector 22 of a specific cylinder. It is also considered that the causes include an abnormality in valve characteristics of an intake valve of a specific cylinder. Further, in the case where an exhaust gas recirculation passage (not shown) for recirculating an exhaust gas discharged to the exhaust passage 32 to the intake passage 12 is provided, it is considered that an abnormality can be caused in an air-fuel ratio of a specific cylinder when an abnormality is caused in fluidity of the recirculated exhaust gas.

The air-fuel ratios of the respective cylinders tend to intermingle with each other while the exhaust gas flows through the exhaust passage 32 (including the branch passages 30), Therefore, even if a state quantity of the exhaust gas such as the oxygen concentration in the exhaust gas discharged to the exhaust passage 32 (or the branch passages 30) changes with time due to a variation in the air-fuel ratio among the cylinders, a degree of the change in the state quantity with time attenuates near the air-fuel ratio sensor 36. Particularly when a quantity of the exhaust gas discharged from each cylinder of the internal combustion engine 10 is small, such the tendency occurs remarkably and there is a possibility that the state quantity of the exhaust gas near the air-fuel ratio sensor 36 does not produce a remarkable change with time due to the variation in the air-fuel ratio among the cylinders, In this case, it is difficult to extract information relating to the variation in air-fuel ratio among the cylinders from the sensing value of the air-fuel ratio sensor 36. When the quantity of the exhaust gas discharged from each cylinder of the internal combustion engine 10 is small, there is also a concern that there occurs a phenomenon that the order of the exhaust gases discharged from the respective cylinders to the exhaust passage 32 (the branch passages 30) differs from the order of the occurrence of the influences of the exhaust gases near the air-fuel ratio sensor 36. In such the case, the each cylinder fuel quantity f(i) cannot be calculated with high accuracy if the observer B16 uses a simple model assuming that the influences of the exhaust gases from the respective cylinders occur in the state quantity of the exhaust gas near the air-fuel ratio sensor 36 in the order of the discharged exhaust gases. As a result, the each cylinder air-fuel ratio A/F(i) cannot be calculated with high accuracy. Therefore, under such a situation, it is difficult to appropriately diagnose the presence or absence of the abnormality in the air-fuel ratio among the cylinders.

Figure 3:
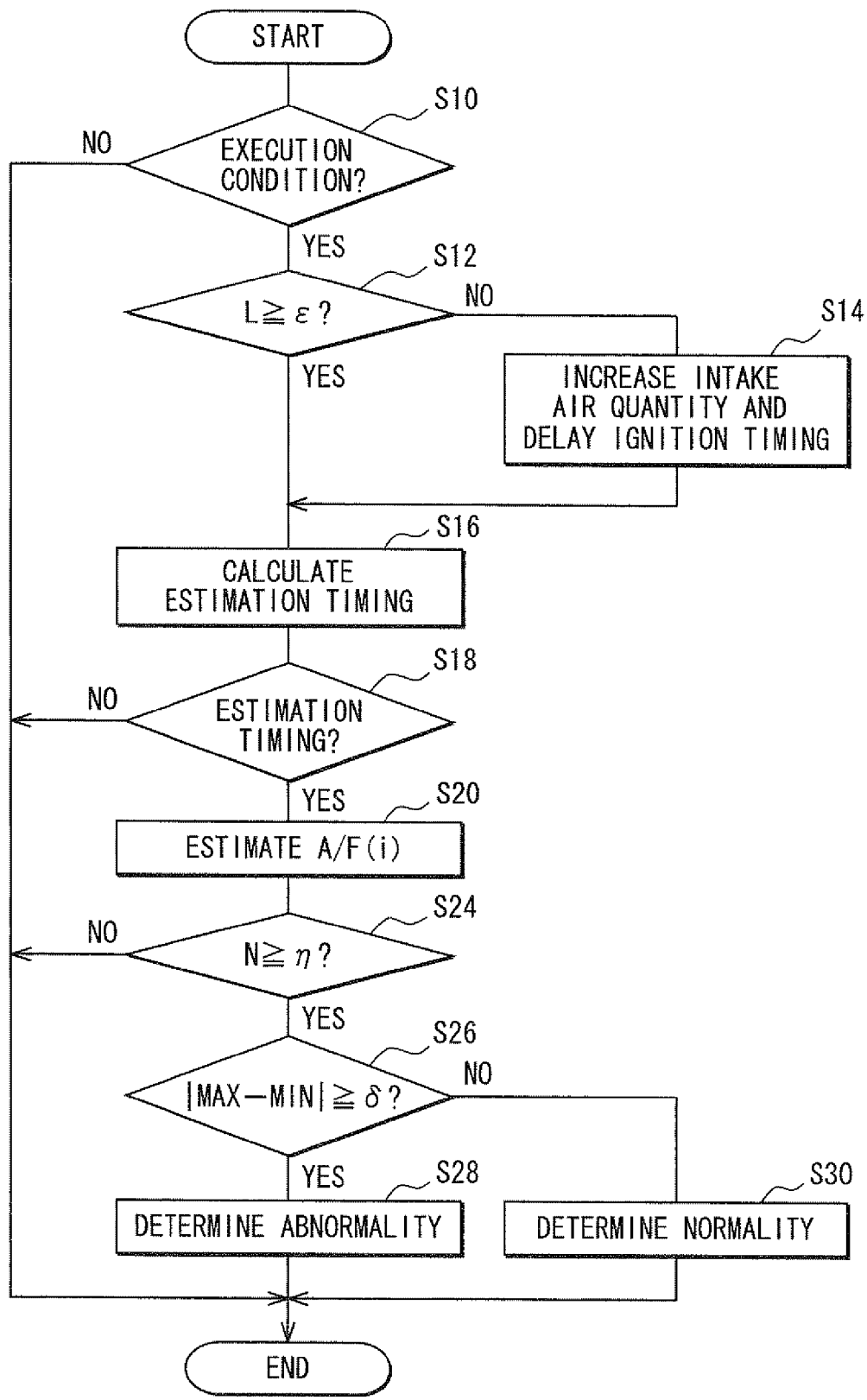
FIG. 3 is a flowchart showing steps of abnormality diagnosis processing according to the first embodiment.

Therefore, the present embodiment performs the abnormality diagnosis only in the case where a quantity of the exhaust gas discharged from each cylinder to the exhaust passage 32 (or the branch passage 30) is equal to or greater than a predetermined value. FIG. 3 shows a processing order of the abnormality diagnosis according to the present embodiment. The ECU 40 repeatedly executes the processing, for example, in a predetermined crank angle cycle (for example, 30° CA).

In a series of the processing, first in S10 (S denotes "step"), it is determined whether an execution condition of the abnormality diagnosis is established. The execution condition consists of following conditions (a) to (e).

(a) A condition that the abnormality diagnosis has not been performed yet in a present trip. In the present embodiment, a single execution of the abnormality diagnosis is aimed during one trip, i.e., during a period since the internal combustion engine 10 is started until the engine 10 is stopped. If the abnormality diagnosis is performed once, the abnormality diagnosis is not performed until the next trip.

(b) A condition that a fluctuation amount of the load factor L is equal to or less than a predetermined value $\alpha$. Thus, a state where the air-fuel ratio of each cylinder is in a steady state is used as a diagnosis execution condition. It is considered that the air-fuel ratio specific to each cylinder can change when the load factor L changes.

(c) A condition that the air-fuel ratio sensor 36 is usable. In the present embodiment, a state where the air-fuel ratio sensor 36 is in an active state is used as the condition. In the case where an abnormality diagnosis function of the air-fuel ratio sensor 36 is provided, the execution condition includes a condition that diagnosis indicating presence of an abnormality in the air-fuel ratio sensor 36 is not given.

(d) A condition that the coolant temperature THW sensed with the coolant temperature sensor 44 is equal to or higher than a predetermined value $\beta$. This condition is provided from a viewpoint that a combustion variation of the internal combustion engine 10 enlarges in an operating state at very low temperature.

(e) A condition that the rotation speed RPM is equal to or less than a predetermined value $\gamma$. This condition is provided from a viewpoint that the time interval between the exhaust top dead centers of the cylinders becomes excessively short when the rotation speed of the internal combustion engine 10 is excessively high. That is, in this case, even if the state quantity of the exhaust gas near the air-Fuel ratio sensor 36 changes with time due to the variation in the air-fuel ratio among the cylinders, the air-fuel ratio sensor 36 cannot sense the change with time because the cycle of the change with time is extremely short.

When it is determined that the above diagnosis execution condition is established, in S12, it is determined whether the load factor L is equal to or greater than a predetermined value $\epsilon$. This processing determines whether the each cylinder air-fuel ratio A/F(i) can be estimated with high accuracy by determining whether a quantity of the exhaust gas discharged from each cylinder per exhaust stroke is equal to or greater than the predetermined value based upon a sensing value of the air flow meter 14. The predetermined value $\epsilon$ is set based upon a lower limit value enabling accurate estimation of the each cylinder air-fuel ratio A/F(i).

When negative determination is made in S12, it is considered that highly accurate estimation of the each cylinder air-fuel ratio A/F(i) is impossible in this state. Therefore, the execution of the abnormality diagnosis is prohibited immediately and the process goes to S14. In S14, the intake air quantity is increased and delay control of the ignition timing is performed. Here, the intake air quantity is increased to increase the load factor L and to produce a state capable of maintaining high estimation accuracy of the each cylinder air-fuel ratio A/F(i). The ignition timing is delayed to restrict an increase in torque of the internal combustion engine 10 due to the increase of the intake air quantity.

If positive determination is made in S12 or the processing in S14 is completed, the process goes to S16. In S16, estimation timing of the each cylinder air-fuel ratio A/F(i) is calculated based upon the rotation speed RPM and the load factor L. The rotation speed RPM is a parameter for performing the estimation once per 180° CA. The load factor L is a parameter for calculating sampling timing of the sensing value of the air-fuel ratio sensor 36 to perform the estimation of the each cylinder air-fuel ratio A/F(i) with the highest accuracy. This setting is made because the timing, at which an influence of an air-fuel ratio of an intended cylinder is reflected in the sensing value of the air-fuel ratio sensor 36 most remarkably, changes in accordance with the load factor L.

In the case where the processing in S16 is completed, it is determined in S18 whether the calculated estimation timing occurs. When it is determined that the estimation timing occurs, the each cylinder air-fuel ratio A/F(i) is estimated in S20. This processing corresponds to the processing shown in FIG. 2. In following S24, it is determined whether the number N of the estimates is equal to or greater than a predetermined number $\eta$. This processing determines whether a sufficient number of the estimates of the each cylinder air-fuel ratio A/F(i) necessary for diagnosing the presence or absence of the abnormality relating to the variation in the air-fuel ratio among the cylinders have been already obtained, The predetermined number $\eta$ is set to be equal to or greater than the number of the cylinders. The predetermined number $\eta$ should be preferably a product of the number of the cylinders and an integer number ($\geq 1$).

In the case where positive determination is made in S24, in S26, it is determined whether an absolute value of a difference between the maximum value MAX and the minimum value MIN of the each cylinder air-fuel ratio A/F(i) is equal to or greater than a predetermined value $\delta$. This processing determines whether an excessive variation is caused in the air-fuel ratio among the cylinders. In the case where the predetermined value $\eta$ is the same as the number of the cylinders, the maximum value and the minimum value of the each cylinder air-fuel ratios A/F(i) of the respective cylinders may be selected. In the case where the predetermined value $\eta$ is set at the integral multiple of the number of the cylinders, the maximum value and the minimum value of the average values of the each cylinder air-fuel ratios A/F(i) may be selected. The predetermined value $\delta$ is set as a difference between the maximum value and the minimum value of the each cylinder air-fuel ratio A/F(i) that cannot be anticipated from individual differences and the like of the injector 22, the branch passage 13, an intake valve and the like.

In the case where it is determined that the absolute value |MAX−MIN| is equal to or greater than the predetermined value $\delta$, it is determined in S28 that the each cylinder air-fuel ratio A/F(i) is abnormal and a signal indicative of the abnormality determination is outputted on the display 46, thereby notifying the abnormality to an outside. In the case where it is determined that the absolute value |MAX−MIN| is less than the predetermined value $\delta$, the process goes to S30, where it is determined that the each cylinder air-fuel ratio A/F(i) is normal.

In the case where negative determination is made in S10, S18 or S24 or in the case where the processing in S28 or S30 is completed, the series of the processing ends once.

The above-described present embodiment exerts following effects.

(1) In the case where it is determined that the quantity of the exhaust gas discharged from each cylinder per exhaust stroke is less than the predetermined value (S12 in FIG. 3: NO), the diagnosis of the presence or absence of the abnormality in the each cylinder air-fuel ratio is prohibited. Thus, the problem of the lowering of the diagnosis accuracy, which can be caused when the abnormality diagnosis is performed under a situation where the diagnosis cannot be performed appropriately, can be averted.

(2) In the case where it is determined that the quantity of the exhaust gas discharged from each cylinder of the multi-cylinder internal combustion engine per exhaust stroke is less than the predetermined value, the intake air quantity is increased and the delay control of the ignition timing is performed to restrict an increase in torque due to the increase of the intake air quantity. In consequence, the execution frequency of the diagnosis can be increased as compared to the case of executing the diagnosis after waiting until the exhaust gas quantity increases. Further, the increase in the torque of the internal combustion engine 10 due to the execution of the abnormality diagnosis can be inhibited.

(3) When the variation in the air-fuel ratio among the cylinders is equal to or greater than the predetermined value, it is determined that the abnormality occurs in the air-fuel ratio. In consequence, the abnormality, the diagnosis of which is particularly desired, can be appropriately diagnosed as the presence or absence of the abnormality in the each cylinder air-fuel ratio.

(4) The diagnosis is performed in the steady state where the fluctuation amount of the load factor of the internal combustion engine 10 is equal to or less than the predetermined value. In consequence, the abnormality diagnosis can be performed easily and highly accurately.

(5) The diagnosis is performed when the rotation speed of the internal combustion engine 10 is equal to or less than the predetermined value. In consequence, the diagnosis can be performed under a situation where the air-fuel ratio sensor 36 can sense the temporal change of the state quantity of the exhaust gas at the junction J due to the variation in the air-fuel ratio among the cylinders.

Figure 4:
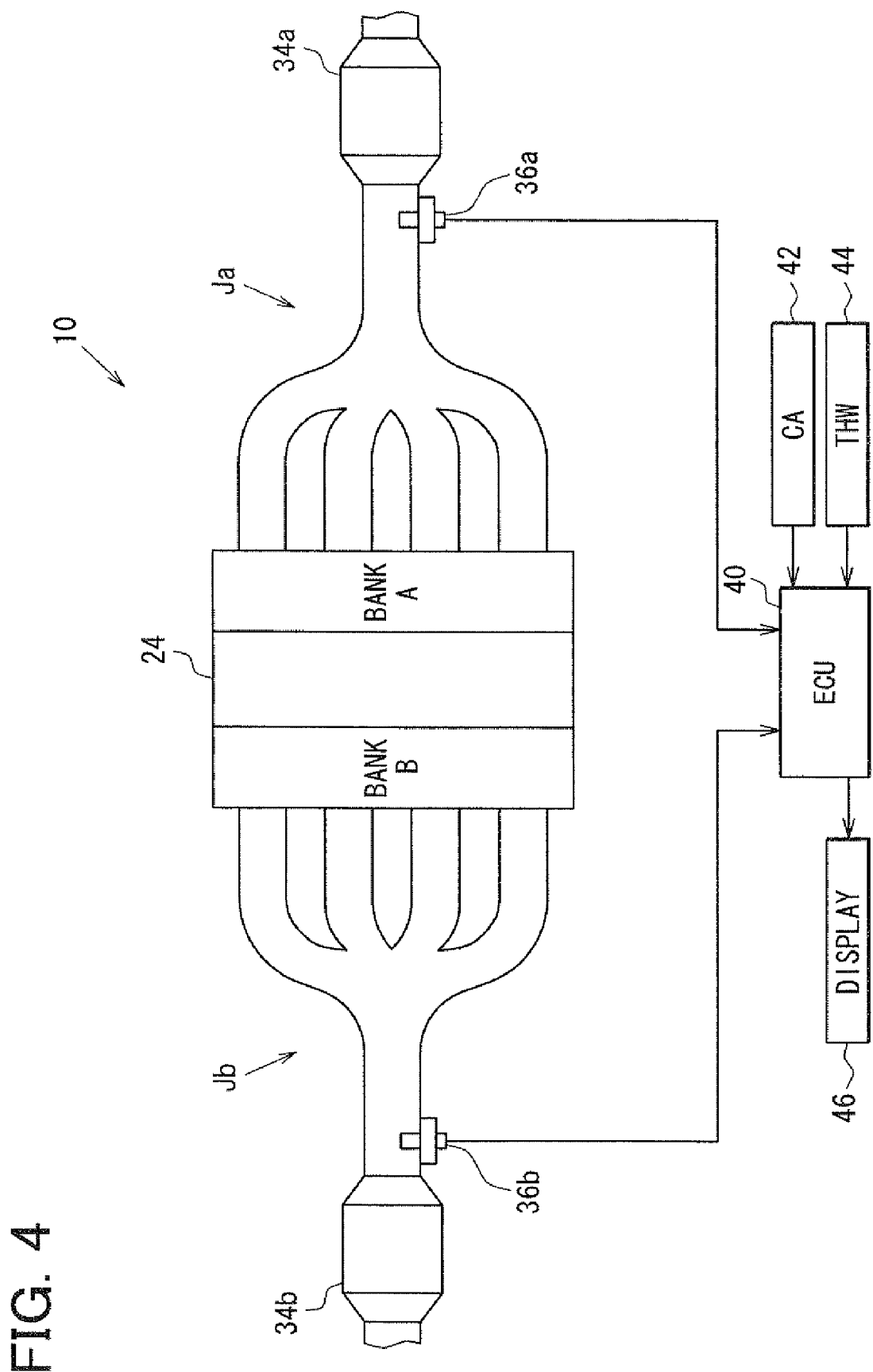
FIG. 4 is a diagram showing a control system of an internal combustion engine according to a second embodiment of the present invention.

Next, a second embodiment of the present invention will be explained with reference to the drawing, centering on differences from the first embodiment. FIG. 4 shows an entire construction of a control system according to the present embodiment. As shown in FIG. 4, in the present embodiment, a V-type eight-cylinder internal combustion engine is used as the internal combustion engine 10. That is, the entire eight cylinders are divided into two banks (bank A and bank B), each having four cylinders. Two exhaust purification devices 34a, 34b are provided. Exhaust gases discharged from each of the cylinders of the banks A, B converge at junctions Ja, Jb respectively and then flow near air-fuel ratio sensors 36a, 36b respectively. In this case, the minimum value of interval between the exhaust top dead centers of the cylinders is 90° CA, Therefore, specifically when a quantity of the exhaust gas discharged from each cylinder is small, an air-fuel ratio of each cylinder is difficult to be reflected in each of sensing values of the air-fuel ratio sensors 36a, 36b.

Further, the inventor found that there can occur a phenomenon that the order of the cylinders reaching the respective exhaust top dead centers differs from the order of the cylinders, whose air-fuel ratios are reflected in the sensing values of the air-fuel ratio sensors 36a, 36b, when the quantity of the exhaust gas discharged from each cylinder is small in the case of the internal combustion engine 10. As a result, a design of the observer becomes complicated because, for example, the design of the observer is fundamentally changed when the exhaust gas quantity is small or the each cylinder air-fuel ratio cannot be appropriately estimated even with the complicated design. Accordingly, it is particularly effective to perform the processing shown in FIG. 3.

The interval between the exhaust top dead centers is 90° CA in the internal combustion engine 10 but the interval between the exhaust top dead centers of the cylinders in each bank is not defined uniquely. Rather, the interval between the exhaust top dead centers of the cylinders in each bank is one of three intervals of 90° CA, 180° CA and 270° CA, Therefore, it is difficult to estimate the each cylinder air-fuel ratio A/F(i) in the mode shown in FIG. 2 Accordingly, for example, as described in JP-A-2005-207354, it is preferable to design the observer to be able to perform the estimation in consideration of an influence of the interval between the exhaust top dead centers of the cylinders discharging the exhaust gas to either one of the junctions Ja, Jb.

The above embodiments may be modified as follows for example.

In each of the above embodiments it is determined whether the quantity of the exhaust gas discharged from each cylinder per exhaust stroke is equal to or greater than the predetermined value based upon the load factor but the invention is not limited thereto. For example, if an air flow meter can be provided in the exhaust passage 32, the determination may be performed based upon a sensing value of the air flow meter. Alternatively, the determination may be performed based upon an opening degree of the throttle valve 18, the rotation speed or the like.

In each of the above embodiments, when the load factor is less than the predetermined value $\epsilon$, the increase control of the intake air quantity is performed and the delay control of the ignition timing is performed to avoid an increase in torque due to the increase of the intake air quantity. The method for restricting the increase in the torque is not limited thereto. For example, a device or a method for increasing negative torque applied to an output shaft of the internal combustion engine 10 may be used to restrict the increase of the torque. For example, a method of increasing power generation of a power generator such as an alternator connected to the output shaft of the internal combustion engine 10 may be used. Also with such the scheme, the increase in the net torque of the output shaft of the internal combustion engine 10 can be restricted.

The device or the method for restricting the increase in the net torque of the output shaft of the internal combustion engine 10 when the load factor is less than the predetermined value $\epsilon$ and the increase control of the intake air quantity is performed may not be provided. For example, in the case where an automatic transmission is connected to the internal combustion engine 10, change in a running state of a vehicle may be restricted by changing a change gear ratio in accordance with the increase in the intake air quantity.

In each of the above embodiments, in the case where the abnormality diagnosis has been already performed within one trip, the diagnosis is not performed again in the same trip. The invention is not limited thereto. For example when the diagnosis is performed once during a unit travel distance, the diagnosis may be prohibited until the travel through the same travel distance is completed. Thus, the diagnosis is performed once per unit travel distance.

The parameter for determining the establishment of the condition that provides the steady state of the air-fuel ratio of each cylinder as the execution condition of the abnormality diagnosis is not limited to the fluctuation amount of the load factor. For example, in the case where an exhaust gas recirculation passage for recirculating the exhaust gas discharged to an exhaust system of the internal combustion engine to an intake system is provided, a fluctuation amount of an exhaust gas recirculation quantity (EGR quantity) may be used in addition to the fluctuation amount of the load factor.

In each of the above embodiments, the coolant temperature is used as a parameter for determining whether the combustion state of the internal combustion engine 10 is stable. However, the parameter is not limited thereto. For example, temperature of hydraulic oil of the internal combustion engine 10 may be used. Alternatively, an operating time of the internal combustion engine 10 and ambient temperature may be used.

In each of the above embodiments, it is determined that the abnormality occurs if the variation in the air-fuel ratio among the cylinders is equal to or greater than the predetermined value δ. The present invention is not limited thereto. For example, the presence or absence of the abnormality in the air-fuel ratio of the individual cylinder may be diagnosed by a method described in Patent document 1 (JP-A-2006-138280).

In each of the above embodiments, the diagnosis is performed by increasing the intake air quantity when the load factor is less than the predetermined value ε. Alternatively, the processing for increasing the intake air quantity may not be performed. Even in this case, the accuracy of the diagnosis can be maintained high by prohibiting the diagnosis when the load factor is less than the predetermined value ε.

The method of estimating the air-fuel ratio of each cylinder is not limited to the example used in the above embodiments. For example, a regular observer may be used instead of the Kalman filter. This scheme can be realized by defining a gain according to a design method of the regular observer instead of a Kalman gain. Even in this case, application of the present invention is effective when estimating the individual air-fuel ratio of each cylinder based upon the air-fuel ratio at the junction J.

The multi-cylinder internal combustion engine is not limited to the intake port injection type engine. Alternatively, an in-cylinder injection type engine (direct injection type engine) may be employed. Further, the internal combustion engine is not limited to the spark ignition type internal combustion engine. However, in the case of a compression ignition type internal combustion engine, an intake throttle valve is usually brought to a fully-open state, so it is rarely necessitated to purposely perform the control for increasing the intake air quantity for the diagnosis, Therefore, the application of the present invention is particularly effective in the case of the internal combustion engine, in which the intake air quantity decreases as the required torque of the engine decreases, such as the internal combustion engine having a correlation between the intake air quantity and the torque.

The number of the cylinders is not limited to four or eight. As the number of the cylinders increases, the estimation of the each cylinder air-fuel ratio tends to become more difficult when the quantity of the exhaust gas discharged from each cylinder is small. Therefore, application of the present invention is particularly effective in such the case.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An abnormality diagnosis device of a multi-cylinder internal combustion engine having a junction where exhaust gases discharged respectively from a plurality of cylinders converge, the abnormality diagnosis device comprising:
   an air-fuel ratio sensing means provided downstream of the junction for sensing an air-fuel ratio of the exhaust gas;
   a diagnosing means for diagnosing presence or absence of an abnormality in an individual air-fuel ratio of each cylinder based upon a sensing value of the air-fuel ratio sensing means;
   a determining means for determining whether a quantity of the exhaust gas discharged from each cylinder per exhaust stroke is equal to or greater than a first predetermined value; and
   a prohibiting means for prohibiting the diagnosis when the determining means determines that the quantity of the exhaust gas is less than the first predetermined value.

2. The abnormality diagnosis device as in claim 1, further comprising:
   an increasing means for increasing an intake air quantity to remove the prohibition by the prohibiting means when the quantity of the exhaust gas discharged from each cylinder per exhaust stroke is less than the first predetermined value; and
   a restricting means for restricting an increase in torque due to an increase in the intake air quantity by the increasing means.

3. The abnormality diagnosis device as in claim 2, wherein the multi-cylinder internal combustion engine is a spark ignition type internal combustion engine, and
   the restricting means includes a means for performing delay control of ignition timing.

4. The abnormality diagnosis device as in claim 1, wherein the diagnosing means determines that the air-fuel ratio is abnormal when a variation in the air-fuel ratio among the cylinders is equal to or greater than a second predetermined value.

5. The abnormality diagnosis device as in claim 1, wherein the diagnosing means performs the diagnosis in a steady state where a fluctuation amount of a filling quantity of an air into each cylinder of the multi-cylinder internal combustion engine is equal to or less than a third predetermined value.

6. The abnormality diagnosis device as in claim 1, wherein the diagnosing means performs the diagnosis when rotation speed of the multi-cylinder internal combustion engine is equal to or less than a fourth predetermined value.

7. A control system of a multi-cylinder internal combustion engine having a junction where exhaust gases discharged respectively from a plurality of cylinders converge, the control system comprising:
   an abnormality diagnosis device including an air-fuel ratio sensing means provided downstream of the junction for sensing an air-fuel ratio of the exhaust gas, a diagnosing means for diagnosing presence or absence of an abnormality in an individual air-fuel ratio of each cylinder based upon a sensing value of the air-fuel ratio sensing means, a determining means for determining whether a quantity of the exhaust gas discharged from each cylinder per exhaust stroke is equal to or greater than a first predetermined value, and a prohibiting means for prohibiting the diagnosis when the determining means determines that the quantity of the exhaust gas is less than the first predetermined value; and
   injectors for supplying fuel to the plurality of cylinders respectively.

8. The control system as in claim 7, further comprising:
   an increasing means for increasing an intake air quantity to remove the prohibition by the prohibiting means when the quantity of the exhaust gas discharged from each cylinder per exhaust stroke is less than the first predetermined value; and a restricting means for restricting an increase in torque due to an increase in the intake air quantity by the increasing means.

9. The control system as in claim 8, wherein
the multi-cylinder internal combustion engine is a spark ignition type internal combustion engine, and
the restricting means includes a means for performing delay control of ignition timing.

10. The control system as in claim 7, wherein
the diagnosing means determines that the air-fuel ratio is abnormal when a variation in the air-fuel ratio among the cylinders is equal to or greater than a second predetermined value.

11. The control system as in claim 7, wherein
the diagnosing means performs the diagnosis in a steady state where a fluctuation amount of a filling quantity of an air into each cylinder of the multi-cylinder internal combustion engine is equal to or less than a third predetermined value.

12. The control system as in claim 7, wherein
the diagnosing means performs the diagnosis when rotation speed of the multi-cylinder internal combustion engine is equal to or less than a fourth predetermined value.

* * * * *